Patented Aug. 8, 1933

1,921,738

UNITED STATES PATENT OFFICE 1,921,738

FOOD FAT AND OIL COLORING MATERIAL

Adino F. Files, Maumee, Ohio, assignor to The Files Packeting Machine Company, Maumee, Ohio, a Corporation No Drawing. Application March 17, 1932
Serial No. 599,596

6 Claims. (Cl. 99—13)

My invention has for its object to provide a dry coloring material for butter, oleomargarine, shortening fats for cooking purposes, both liquid and solid, salad oil and other oleaginous foods. It particularly has for its object to provide a coloring material of the class described that may be easily handled commercially and conveniently applied by the consumer for coloring food fats and oils.

Heretorore an oil coloring material has been used for coloring food fats and oils. The oil is ordinarily contained in bottles or capsules which are liable to breakage and loss of their contents, as well as discoloring or soiling of other articles during shipping, storing, as well as during the handling and use thereof by the consumer. The application of coloring oil to foods consisting of relatively hard fats, such as butter or oleomargarine, as distinct from salad oils and shortening oils, requires careful manipulation to prevent loss of the colored oil during the working of the color into the fats. Also, portions of the fats will be deeply colored by reason of disproportionate placement of the coloring material and, unless thoroughly mixed, produces uneven distribution of the coloring material and as a rule produces streaks that appear when the food and the colored oil is allowed to stand. Unless the fats are thoroughly worked, which requires considerable time and effort, spots and shades of varying color or shade appear throughout the food fat. It is impossible to produce initial general distribution without spots and streaks appearing unless an exceedingly long time is used for working the color into the material.

By my invention a coloring material may be readily distributed over the entire surface of the fat. If desired, the fats, such as butter or oleomargarine, may be flattened or spread quite as desired and the material scattered over the surface and easily worked into the hard fat. My invention thus results in a saving of the coloring material as against loss. It also provides a coloring material that may be easily dispensed and handled at a very low cost. It also provides a coloring material that may be readily applied to the food fats or oils to be colored thereby.

The material embodying my invention is pulverulent in form, nonagglutinative, nonaggregative and nonhygroscopic. Also, the material is formed of two parts, one the color material and the other the carrier for the color material. The color material is of a character that will be readily taken up by the oils and fats to produce the desired color and the carrier is of the character that will be readily taken up by the oils and is, moreover, readily soluble in water. It is thus of such a character that it will be readily absorbed by oils and is the formation of oleomargarine and butter, where water is present, the carrier will be quickly absorbed by the water. It is also of such a character that it will be more readily dissolved in the water than in the oils and fats. Consequently, it is of such a character that it lends itself to efficient coloring of butter and oleomargarine because of the presence of water that works out during the working of the fats in the formation of butter or oleomargarine. Furthermore, the carrier being nonhygroscopic may be allowed to stand in a damp atmosphere, such as is common in dairies and where oleomargarine is manufactured, without causing aggregation or lumping of the coloring material. Consequently, the coloring material may be conveniently introduced into churns and the like, or in the butter or oleomargarine working machines in the desired quantity, with the result that the color will be taken up by the fats and the carrier will be discharged with the water.

The color used may be varied but I find it preferable to use benzeneazo-b-naphthylamine and ortho-tolueneazo-b-naphthylamine, also known and indicated in the art as yellow A. B. and O. B. respectively. The dyes are mixed in the proportion of 1 of A. B. to 9 of O. B. to accomplish the best results. It is understood, however, that these proportions may be varied to vary the tint as may be desired. If desired, however, vegetable coloring materials may be used in place of yellow A. B. and O. B. To 10 grains of the dye mixture I preferably add 240 grains of sugar of milk or lactose. These ingredients are thoroughly mixed by trituration in order that the dyes may be thoroughly incorporated in the mixture. The lactose is of such a character that it will readily release the dye in the presence of the fat, the dye being absorbed by the fat. The dye enters into the solution with the fat and thus the fat is completely colored by the dye, as distinct from being attached to particles of fat. The lactose, moreover, is dissolved in water, or if water is not present, will be dissolved in the fat with the dye. The quantity of dye may be varied from 1 of the A. B. to 40 of the O. B. and from 1 of the A. B. to 3 of the O. B. Also the quantity of the dye relative to the lactose may be greatly varied, as from 1 to 50 parts of the lactose or 1 to 10 parts of the lactose according to the intensity desired. Also, the amount of the coloring material used per quantity of food fat or oil to be colored, may be varied to obtain the desired shade of color. I have found that 1 of dye to 24 of lactose, where 5 grains of the mixture is used per pound of butter, is the most acceptable. In place of a mixture of the A. B. and O. B. aniline dyes, a similar proportionate amount of the following coloring extracts, namely, that of annato, carrotin and turmeric, may be used.

Ordinary sucrose, such as cane sugar, cannot be readily used because of its hygroscopic and its cementitious characteristic, and also because of its resistance to absorption or solution in oils. Lactose thus provides an efficient carrier for the dye and also, since it is readily colored by the dye and dissolves in the fat or oil quite as readily as the color is dissolved in the fat or oil. In coloring oleomargarine and butter, water being present, the lactose is quickly dissolved in the water and is discharged with water during the working of the butter and oleomargarine.

I claim:

1. A dry coloring material for edible fats and oils consisting of a mixture of a dye and lactose.

2. A dry coloring material for edible fats and oils comprising a dye and lactose substantially free of oil.

3. A dry coloring material for edible fats and oils consisting quite entirely of a dye and lactose.

4. A dry coloring material for edible fats and oils consisting of a minor proportion of aniline dye and a major quantity of lactose and substantially free from oil.

5. A dry coloring material for edible fats and oils consisting of dye intimately associated with pulverized lactose.

6. A dry coloring material for edible fats and oils comprising an aniline dye intimately associated with pulverized lactose and substantially free from other binding material.

ADINO F. FILES.